(12) United States Patent
Oh

(10) Patent No.: US 8,833,718 B2
(45) Date of Patent: *Sep. 16, 2014

(54) SPRINKLER MOUNTING DEVICE

(71) Applicant: Kofulso Co., Ltd., Incheon-Si (KR)

(72) Inventor: Seung-il Oh, Seoul (KR)

(73) Assignee: Kofulso Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/934,472

(22) Filed: Jul. 3, 2013

(65) Prior Publication Data

US 2013/0291461 A1    Nov. 7, 2013

Related U.S. Application Data

(63) Continuation of application No. 12/662,549, filed on Apr. 22, 2010, now Pat. No. 8,500,079.

(51) Int. Cl.
| | | |
|---|---|---|
| B42F 13/00 | (2006.01) | |
| F16L 3/10 | (2006.01) | |
| A62C 35/68 | (2006.01) | |
| F16L 3/24 | (2006.01) | |
| E04B 9/00 | (2006.01) | |

(52) U.S. Cl.
CPC ............. *A62C 35/68* (2013.01); *F16L 3/1075* (2013.01); *F16L 3/24* (2013.01); *E04B 9/006* (2013.01)
USPC ................... 248/343; 248/222.52; 248/230.4; 239/283

(58) Field of Classification Search
USPC .......... 248/221.11, 222.51, 222.52, 342, 343, 248/214, 228.6, 230.6, 231.71, 316.5, 248/230.4, 228.4; 169/16, 37, 51; 52/39; 239/282, 283, 273; 269/3, 6, 95, 143, 269/249; 29/268, 278, 255
See application file for complete search history.

(56) References Cited

U.S. PATENT DOCUMENTS

| | | | | |
|---|---|---|---|---|
| 1,539,943 A | * | 6/1925 | Greve | ............................. 81/90.6 |
| 1,665,478 A | * | 4/1928 | Scholz | ........................... 152/228 |
| 3,608,857 A | | 9/1971 | Hibbeler | |
| 3,612,461 A | | 10/1971 | Brown | |
| 3,652,780 A | | 3/1972 | Wilson | |
| 3,828,403 A | | 8/1974 | Perrin et al. | |
| 3,874,035 A | | 4/1975 | Schuplin | |
| 4,135,692 A | | 1/1979 | Ferguson | |
| 4,296,615 A | * | 10/1981 | Zoor | ................................. 70/19 |
| 4,717,099 A | | 1/1988 | Hubbard | |
| 4,723,749 A | | 2/1988 | Carraro et al. | |
| 4,969,923 A | | 11/1990 | Reeder et al. | |
| 5,136,757 A | * | 8/1992 | Labonville | ...................... 24/271 |
| 5,595,363 A | | 1/1997 | DeLeebeeck | |
| 5,667,181 A | | 9/1997 | van Leeuwen et al. | |
| 6,260,810 B1 | | 7/2001 | Choi | |
| 6,345,800 B1 | | 2/2002 | Herst et al. | |
| 6,554,231 B2 | | 4/2003 | Choi | |
| 6,811,130 B1 | | 11/2004 | Oh | |
| 7,264,214 B2 | | 9/2007 | Oh | |

(Continued)

*Primary Examiner* — Alfred J Wujciak

(74) *Attorney, Agent, or Firm* — One3 IP Management, P.C.; Jeromye V. Sartain

(57) ABSTRACT

Disclosed is a sprinkler mounting device having a mounting bracket that includes a tightening member mounted on the front of a bracket body for opening and closing an open portion by a lever, so that the tightening member can firmly hold a reducer, to which a head is joined, once a worker shifts the lever back after inserting the reducer into the bracket body.

10 Claims, 16 Drawing Sheets

(56) References Cited

U.S. PATENT DOCUMENTS

| | | |
|---|---|---|
| 7,427,051 B2 | 9/2008 | Oh |
| 7,455,268 B2 | 11/2008 | Heath |
| 7,506,845 B2 | 3/2009 | Oh |
| 7,735,787 B2 | 6/2010 | Kafenshtok et al. |
| 7,784,746 B2 | 8/2010 | Kafenshtok et al. |
| 7,845,599 B2 * | 12/2010 | Jackson .......................... 248/73 |
| 8,109,482 B2 | 2/2012 | Oh |
| 8,272,615 B2 | 9/2012 | Silcox et al. |
| 8,500,079 B2 * | 8/2013 | Oh ................................ 248/343 |
| 2008/0099640 A1 | 5/2008 | Kafenshtok et al. |
| 2011/0154755 A1 | 6/2011 | Oh |
| 2011/0186697 A1 | 8/2011 | Hickle et al. |
| 2011/0215566 A1 | 9/2011 | Stempo et al. |

* cited by examiner

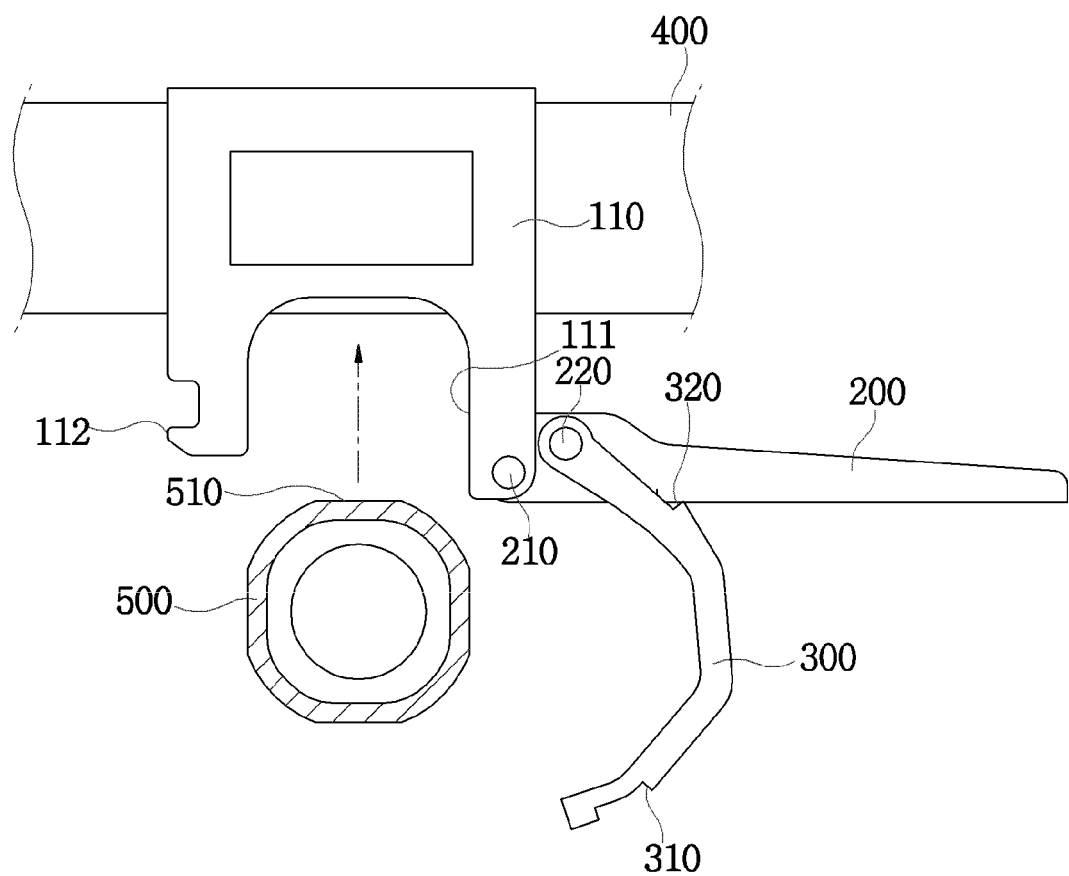

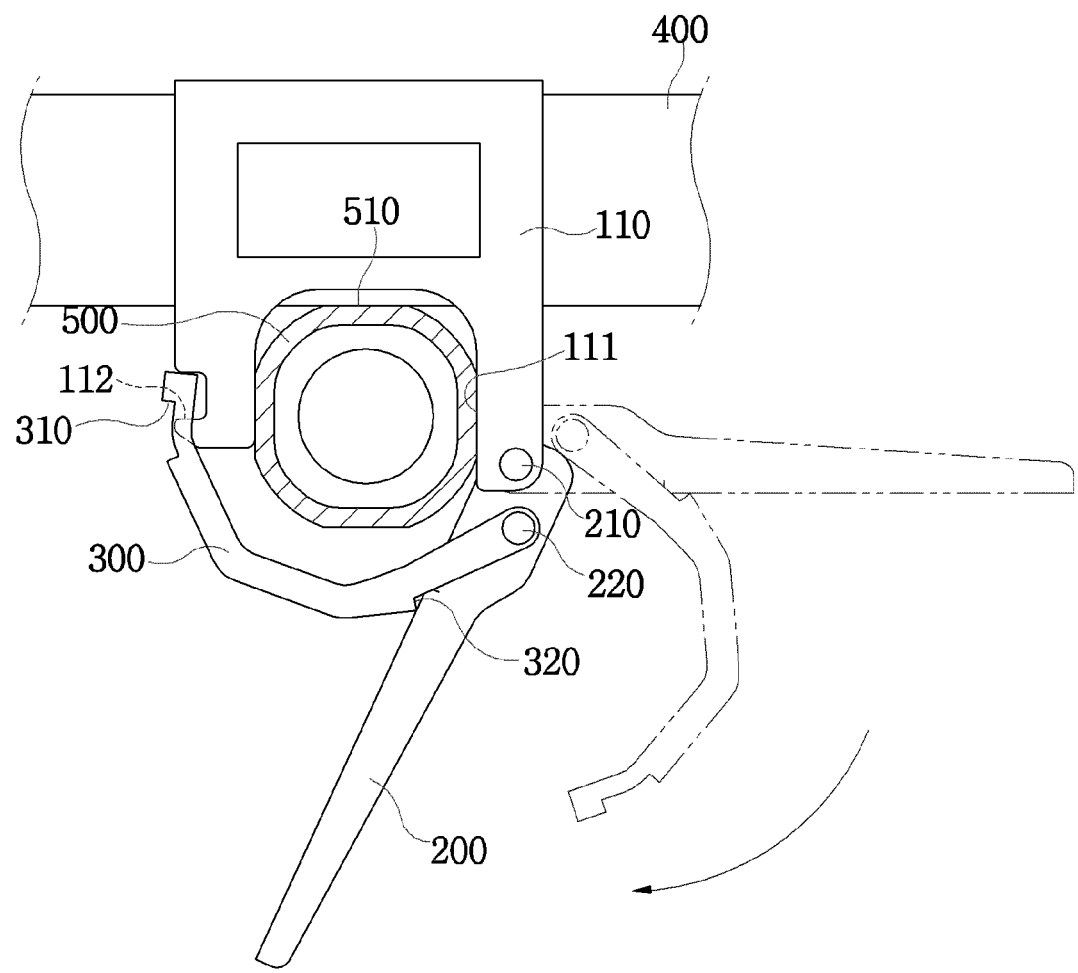

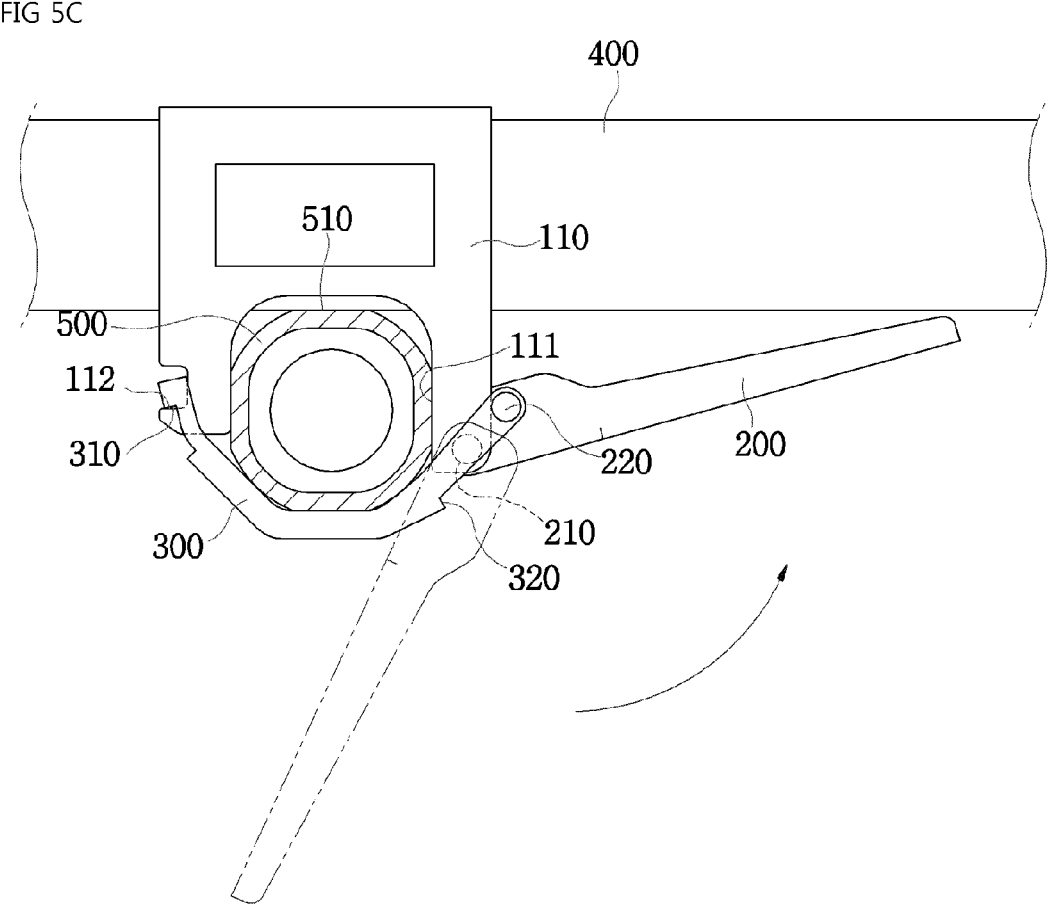

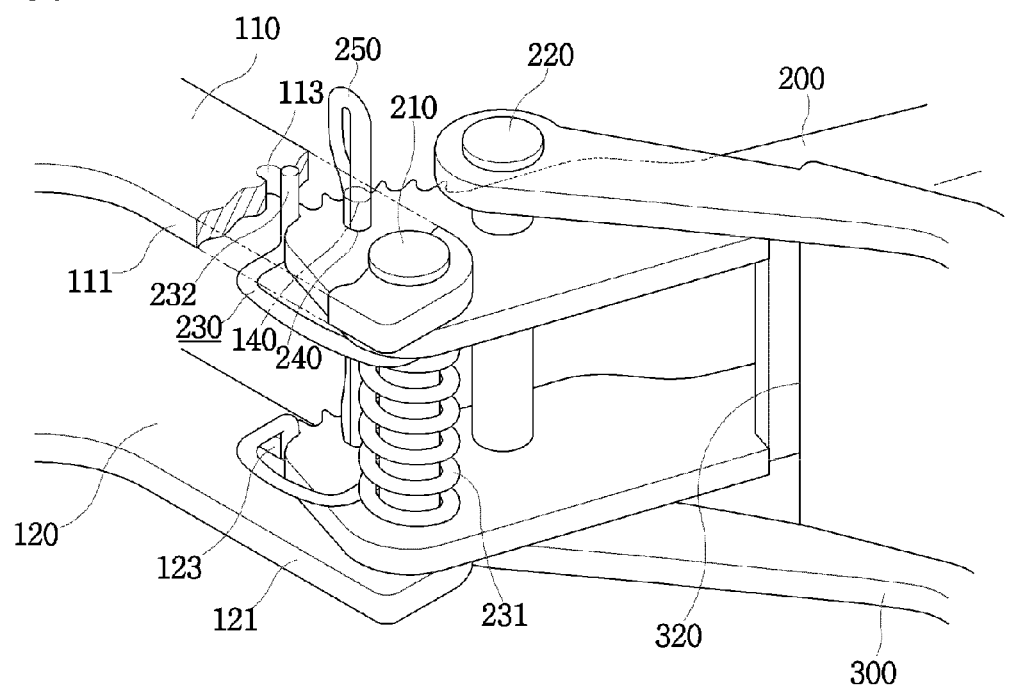

SPRINKLER MOUNTING DEVICE

RELATED APPLICATIONS

This is a continuation application of a prior filed and currently pending application having Ser. No. 12/662,549 and filing date of Apr. 22, 2010.

INCORPORATION BY REFERENCE

Applicant hereby incorporates herein by reference any and all U.S. patents and U.S. patent applications cited or referred to in this application.

BACKGROUND OF THE INVENTION

1. Field of the Invention

The present invention relates to a sprinkler mounting device that includes an open-type mounting bracket, to which a reducer is fit and firmly joined from the front.

2. Background Art

In general, a mounting bracket mounted on the support bar in a laterally movable manner is divided into a closed-type mounting bracket that a reducer is perpendicularly fit thereto and an open-type mounting bracket that the reducer is fit thereto from the front.

FIG. 1 illustrates a sprinkler mounting device using the closed-type mounting bracket. The mounting bracket 1 includes: insertion holes 2 formed on both side walls thereof for inserting a support bar 7 thereinto; a bent portion 4 having a space portion 3 formed in front of the support bar 7, which is inserted into the insertion holes 2, for allowing a reducer 8 to be vertically inserted and fit into the space portion 3; an open portion 5 formed on the opposite side of the bent portion 4; and a pressing member 6 mounted at the open portion 5 for fastening the reducer 8 inserted into the space portion 3.

As described above, in case of the above-mentioned closed-type mounting bracket 1, since the reducer 8 is vertically inserted and fit into the space portion of the mounting bracket, the reducer 8 cannot be mounted on the mounting bracket 1 in a state where a head 9 is joined to the reducer 8, and hence, the closed-type mounting bracket 1 has a problem in that a user must carry out not only reducer-mounting work but also head-mounting work in an uncomfortable position that he or she stands on a foothold.

FIG. 2 illustrates the open-type mounting bracket proposed to overcome the problem of the closed-type mounting bracket 1. The open-type mounting bracket includes: a body 11 having a mounting portion 12 for allowing a reducer 8 to be fit from the front; a rotatable member 13 having one side shaft-mounted at the front portion of the body 11 for opening and closing a mounting portion 12; and a tightening screw 14 mounted on the rotatable member 13 for fixing the reducer.

However, the open-type mounting bracket 10 having the above structure has a problem in that a mounted status of a sprinkler head 9 is unstable since the reducer 8 is fixed only by a tightening force of the tightening screw 14.

SUMMARY OF THE INVENTION

Accordingly, the present invention has been made to solve the above-mentioned problems occurring in the prior arts, and it is an object of the present invention to provide a sprinkler mounting device having a mounting bracket that includes a tightening member mounted on the front of a bracket body for opening and closing an open portion by a lever, so that the tightening member can firmly hold a reducer, to which a head is joined, once a worker bends the lever back after inserting the reducer into the bracket body.

To accomplish the above object, according to the present invention, there is provided a sprinkler mounting device comprising: T-shaped frames mounted on a ceiling at a predetermined interval in parallel; a support bar mounted on the T-shaped frames at right angles from the T-shaped frames; a mounting bracket, the mounting bracket including a ⊏-shaped bracket body having a closed face bent between parallel upper and lower faces for allowing the support bar to be insertedly mounted between the upper and lower faces, mounting slots respectively formed on the upper and lower faces for insertedly fitting a reducer onto the upper and lower faces from the front, retaining jaw portions, each being formed at one side of each of the mounting slots, a lever mounted rotatably on a first hinge shaft at the other side of the mounting slots, and a tightening member bent in correspondence to a section of the reducer, the tightening member having a locking recess formed at one side thereof and caught to the retaining jaw portions and a hinge space portion formed at the other side thereof, the tightening member being mounted rotatably on a second hinge shaft of the lever; and the reducer insertedly mounted into the mounting slots of the mounting bracket.

As described above, after the reducer to which the head is joined is insertedly fit into the mounting slots formed at the front of the mounting bracket and the retaining jaw portions are caught to the locking recess, when the lever is pulled, the tightening member tightens and firmly fixes the reducer.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 5A, 5B and 5C are views showing a state where a reducer is mounted on the mounting bracket according to the present invention;

FIG. 6 is a perspective view showing essential parts of a mounting bracket having locking means mounted on a lever according to a second preferred embodiment of the present invention;

DETAILED DESCRIPTION OF THE PREFERRED EMBODIMENT

Reference will be now made in detail to the preferred embodiment of the present invention with reference to the attached drawings.

Figure 3:
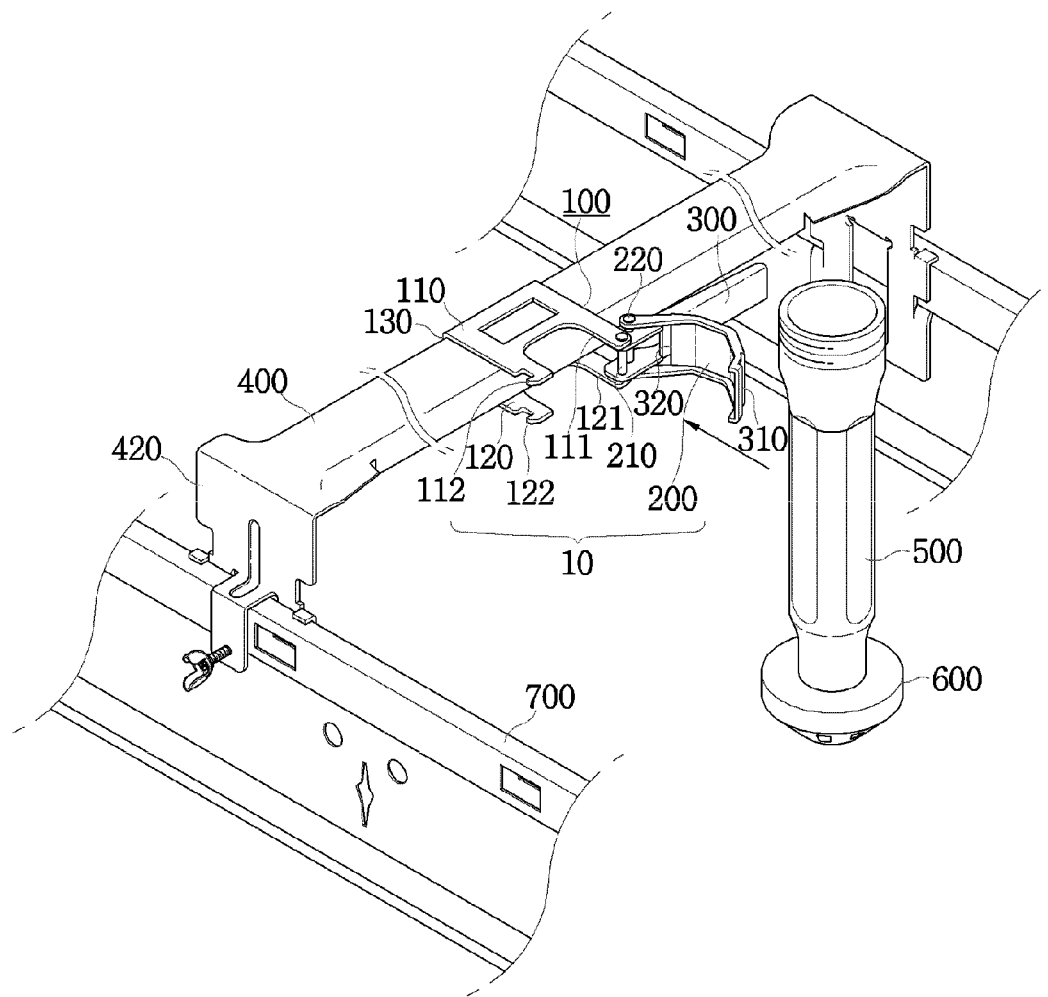
FIG. 3 is an exploded perspective view of a sprinkler mounting device according to the present invention.

As shown in FIG. 3, a sprinkler mounting device according to the present invention includes: T-shaped frames 700 mounted on a ceiling at a predetermined interval in parallel; a support bar 400 mounted on the T-shaped frames at right angles from the T-shaped frames; and a mounting bracket 10 mounted on the support bar 400 in a laterally movable manner. The mounting bracket 10 serves to fix a reducer 500, on which a head 600 is joined, to the support bar 400.

Figure 1:
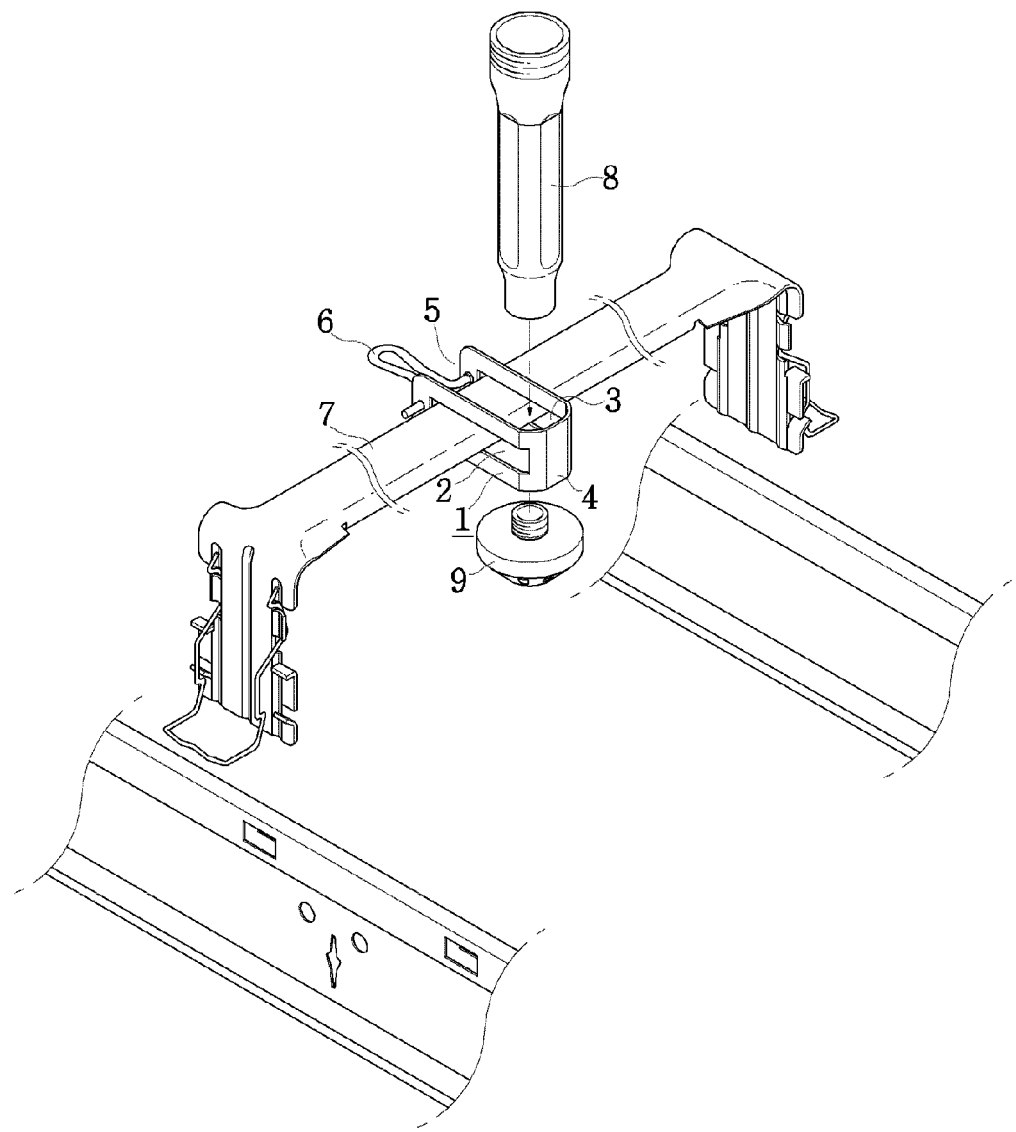
FIG. 1 is an exploded perspective view of a sprinkler mounting device having a closed-type mounting bracket according to a prior art.
Figure 2:
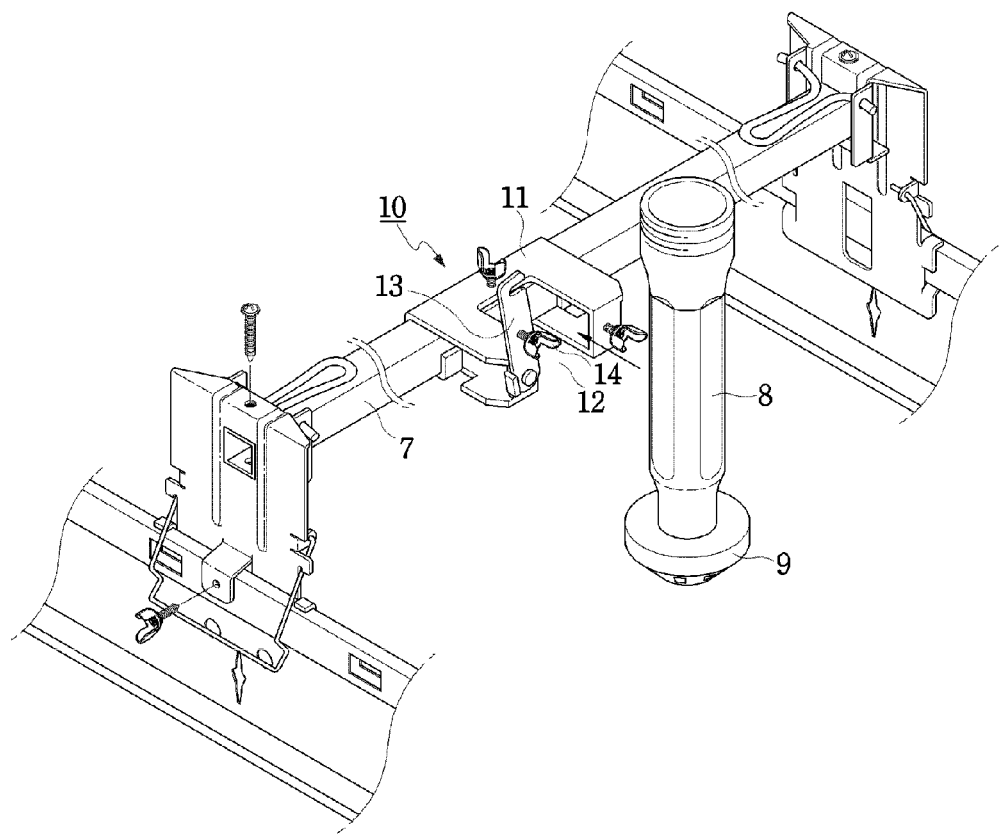
FIG. 2 is an exploded perspective view of a sprinkler mounting device having an open-type mounting bracket according to another prior art.

As shown in FIG. 3, the support bar 400 includes bent portions 420 formed integrally with the support bar 400 or formed separately from the support bar 400 (see FIG. 2).

Figure 4:
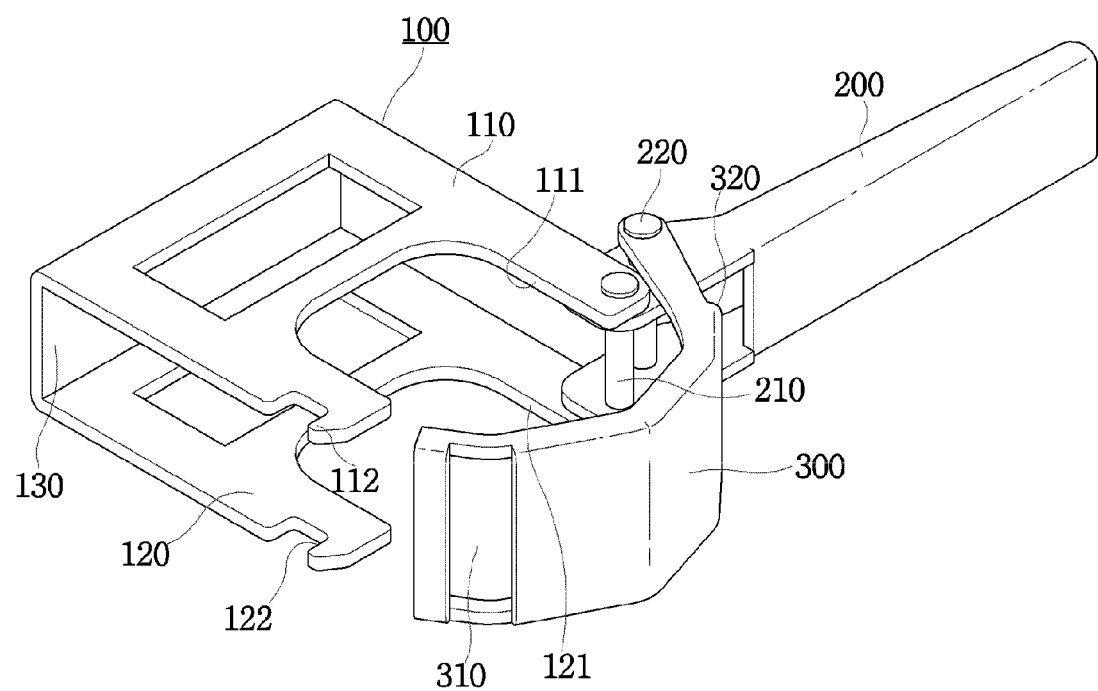
FIG. 4 is a perspective view showing a mounting bracket according to a first preferred embodiment of the present invention.

FIG. 4 illustrates the mounting bracket 10 according to a first preferred embodiment of the present invention. As shown in the drawing, the mounting bracket 10 includes: a ⌐-shaped bracket body 100 having a closed face 130 bent between parallel upper and lower faces 110 and 120 for allowing the support bar 400 to be insertedly mounted between the upper and lower faces 110 and 120; mounting slots 111 and 121 respectively formed on the upper and lower faces 110 and 120 for insertedly fitting the reducer 500 onto the upper and lower faces 110 and 120 from the front; retaining jaw portions 112 and 122, each being formed at one side of each of the mounting slots 111 and 121; a lever 200 mounted rotatably on a first hinge shaft 210 at the other side of the mounting slots 111 and 121; and a tightening member 300 bent in correspondence to a section of the reducer 500, the tightening member 300 having a locking recess 310 formed at one side thereof and caught to the retaining jaw portions 112 and 122 and a hinge space portion 320 formed at the other side thereof, the tightening member 300 being mounted rotatably on a second hinge shaft 220 of the lever 200.

In case of the support bar 400 having the bent portions 420 formed integrally with both sides thereof, which are respectively joined with the T-shaped frames 700, after the bracket body 100 is mounted on the support bar 400, the lever 200 is joined to the bracket body 100 via the first hinge shaft 210.

Now, a process to mount the reducer to the mounting bracket according to the first preferred embodiment of the present invention having the structure as described above will be described.

First, as shown in FIG. 5A, the reducer 500, to which the head 600 is joined, is inserted into the mounting slots 111 and 121 in a state where the lever 200 and the tightening member 300 are bent back to one side, and then, when the lever 200 is bent toward the retaining jaw portions 112 and 122, the tightening member 300 rotates on the first hinge shaft 210 together with the lever 200.

As shown in FIG. 5B, in a state where the locking recess 310 of the tightening member 300 rotated on the first hinge shaft 210 is located on the retaining jaw portions 112 and 122, when the lever 200 is pulled, it comes back up, and then, the second hinge shaft 220 is rotated on the first hinge shaft 210.

When the second hinge shaft 220 is rotated on the first hinge shaft 210, as shown in FIG. 5C, the tightening member 300 tightly catch the reducer 500 in a state where the retaining jaw portions 112 and 122 are inserted into the locking recess 310 and the tightening member 300 surrounds the reducer 500, such that the reducer 500 is firmly fixed to the support bar 400.

FIG. 6 illustrates a mounting bracket according to a second preferred embodiment of the present invention, which further includes locking means mounted on the lever 200 in order to prevent that a worker moves the position of the reducer 500 as he or she pleases after inspection of fire-fighting equipment.

The locking means includes: elongated holes 113 and 123 formed at sides of the upper and lower faces 110 and 120; a spring 230 having a spirally wound portion 231, to which the first hinge shaft 210 is fit, and vertical end portions 232 extending from both ends of the spirally wound portion 231 and being inserted into the elongated holes 113 and 123; and a one-way latch portion 201 formed at one end of the lever 200 in such a way as to correspond to the vertical end portion 232.

It is preferable that the bracket body 100 and the lever 200 further include locking holes 140 and 240 formed near the elongated hole 113 for inserting a safety pin 250 thereinto, so that the lever 200 cannot be pulled before the safety pin 250 is removed from the locking holes 140 and 240.

Figure 7:
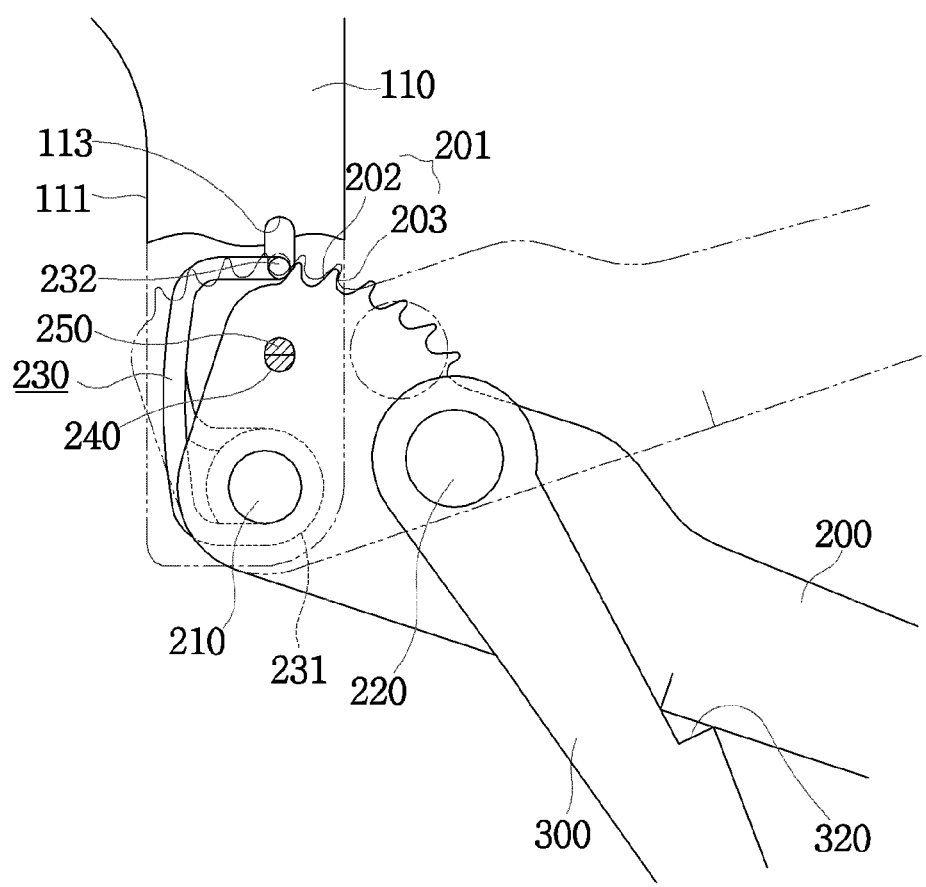
FIG. 7 is a plan view of FIG. 6.

When the lever 200 is pulled after the safety pin 250 is removed from the locking holes 140 and 240 in order to mount the reducer 500, an inclined portion 202 of the latch portion 201 pushes the vertical end portions 232 to the ends of the elongated holes 113 and 123, and then, the vertical end portions 232 go over. In a state where the lever 200 is pulled completely, as shown in FIG. 7, the lever 200 is in a locked state since the vertical end portions 232 are caught to retaining portions 203 by elastic force of the spring 230.

Figure 8:
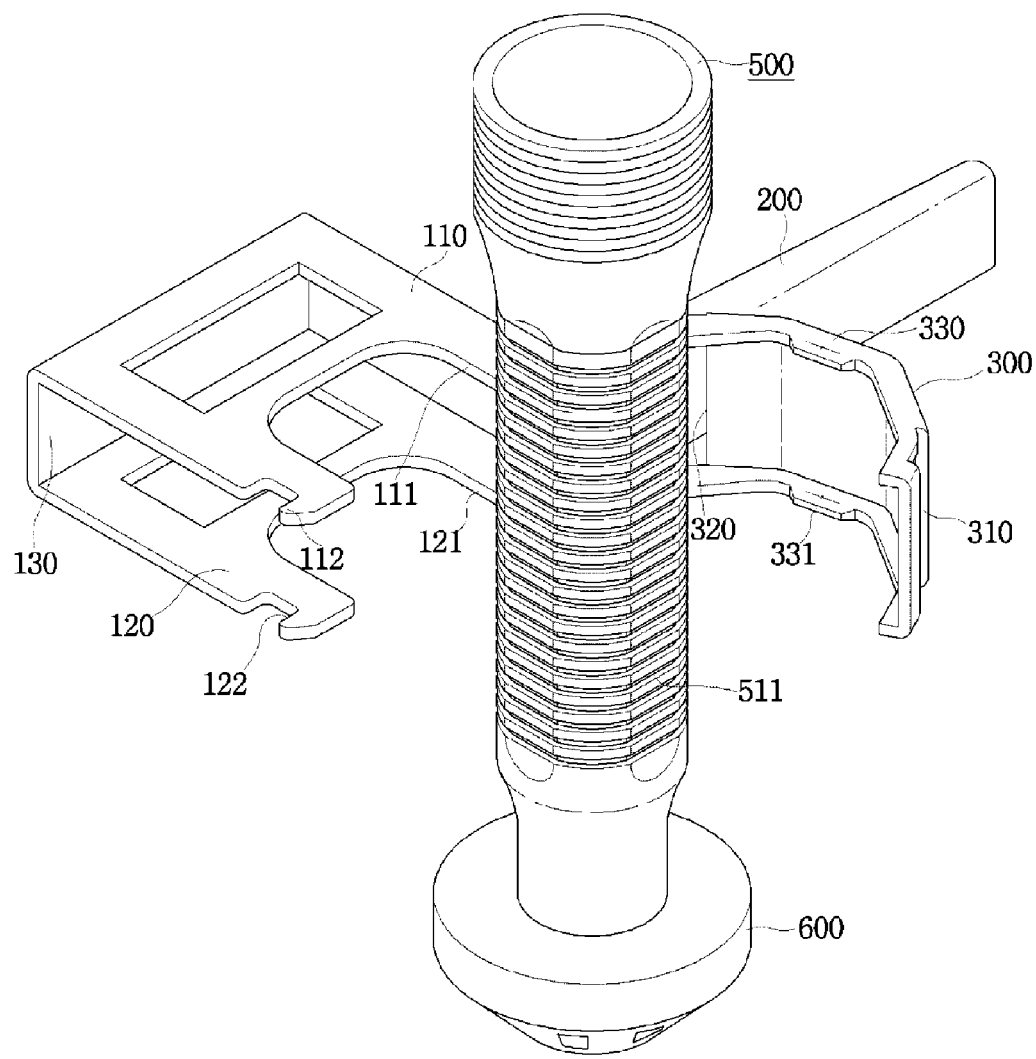
FIG. 8 is a perspective view of a mounting bracket according to a third preferred embodiment of the present invention.

FIG. 8 illustrates a mounting bracket according to a third preferred embodiment of the present invention. As shown in FIG. 8, the tightening member 300 includes upper and lower stoppers 331 protrudingly formed at the centers of horizontal portions 330 of the tightening member 300, and the reducer 500 includes a plurality of horizontal grooves 511 formed on flat portions 510 thereof in correspondence to the stoppers 331 of the tightening member 300.

Figure 9:
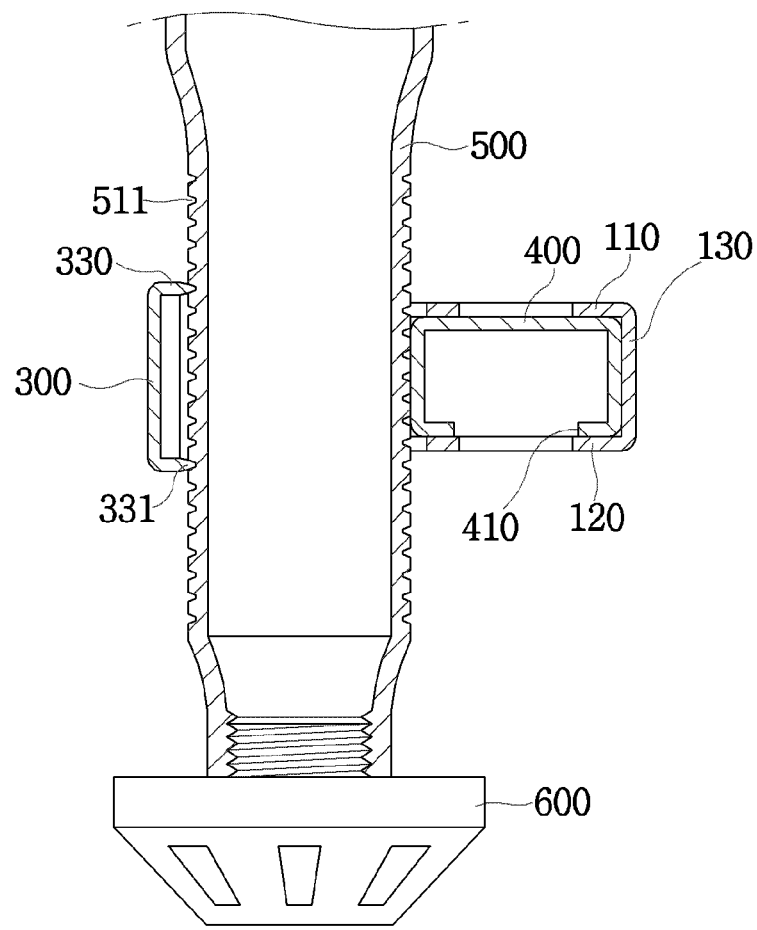
FIG. 9 is a sectional view of FIG. 8.

As shown in FIG. 9, the stoppers 331 are fit into the horizontal grooves 511 to thereby prevent a vertical movement of the reducer 500.

Figure 10:
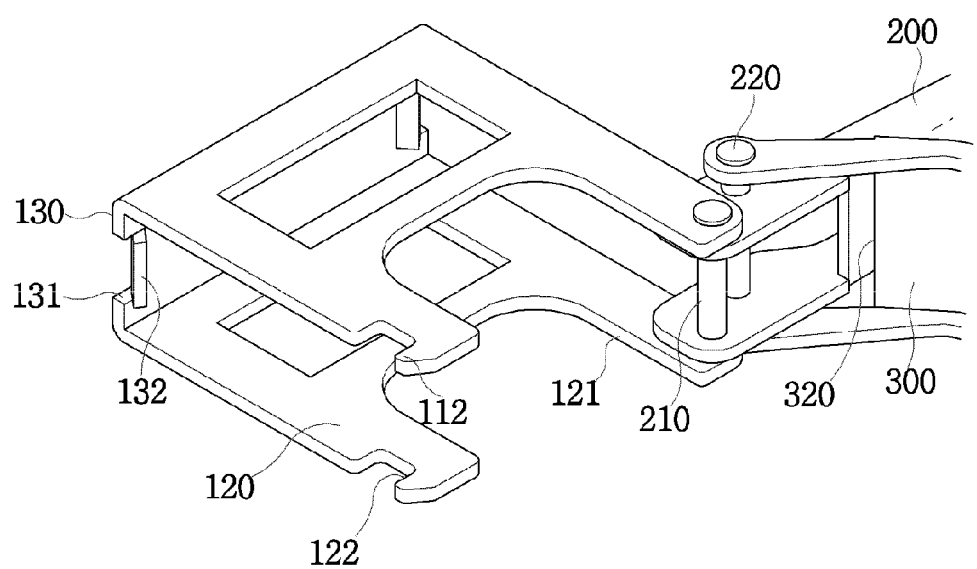
FIG. 10 is a perspective view of a mounting bracket according to a fourth preferred embodiment of the present invention.

FIG. 10 illustrates a mounting bracket according to a fourth preferred embodiment of the present invention. As shown in the drawing, the mounting bracket 100 includes cut portions 131 formed at both sides of the closed face 130 and cut pieces 132 inwardly inclined and bent by the cut portion 131. The cut pieces 132 are inserted into a plurality of vertical groove portions 401 formed on a rear face of the support bar 400.

Figure 11:
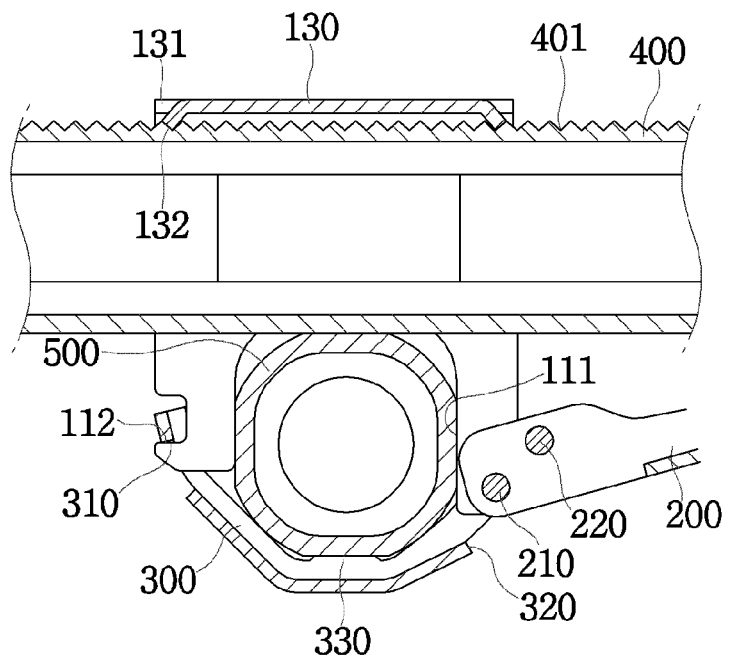
FIG. 11 is a sectional view of FIG. 10.

The cut pieces 132 are insertedly fit into the vertical groove portions 401 in a state where the reducer 500 is fixed and mounted as shown in FIG. 11, such that the reducer 500 cannot be moved laterally.

Figure 12:
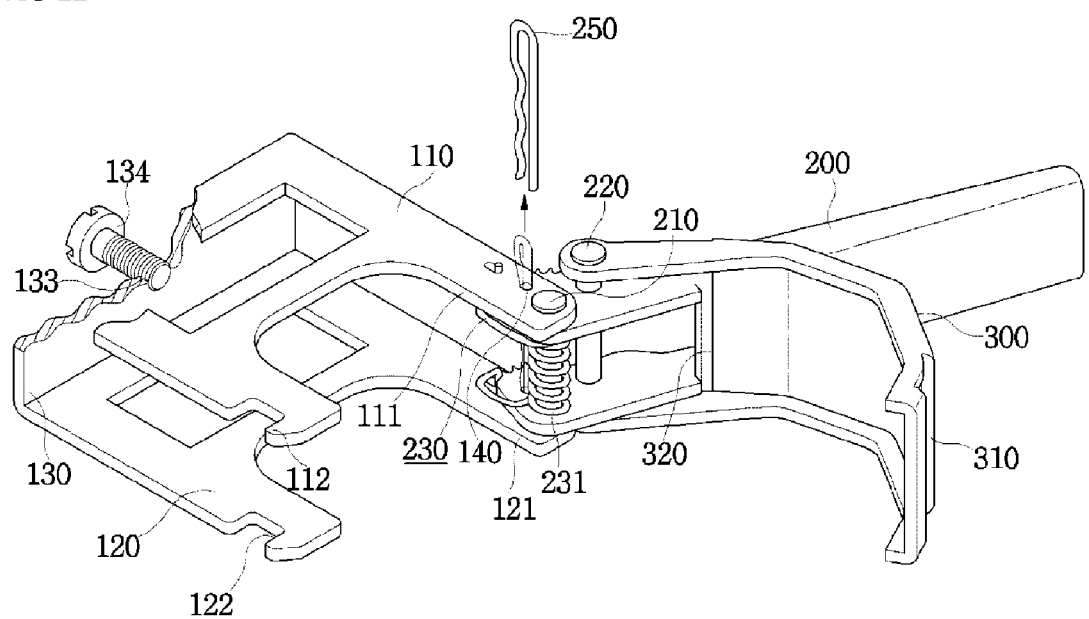
FIG. 12 is a perspective view of a mounting bracket according to a fifth preferred embodiment of the present invention.

FIG. 12 illustrates a mounting bracket according to a fifth preferred embodiment of the present invention. As shown in the drawing, the mounting bracket includes a screw hole 133 penetratingly formed in the closed face 130 described in the first preferred embodiment, and a tightening screw 134 is coupled to the screw hole 131.

Figure 13:
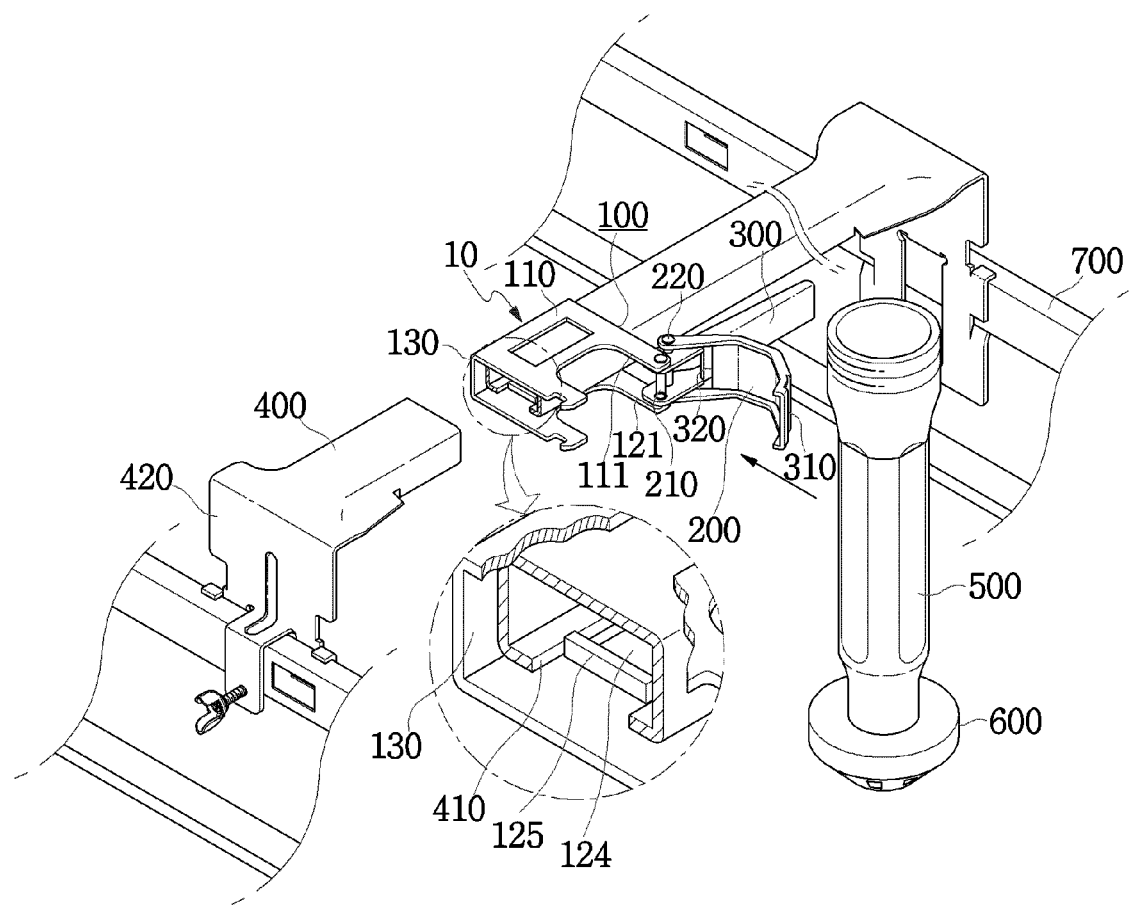
FIG. 13 is a perspective view of a mounting bracket according to a sixth preferred embodiment of the present invention.
Figure 14:
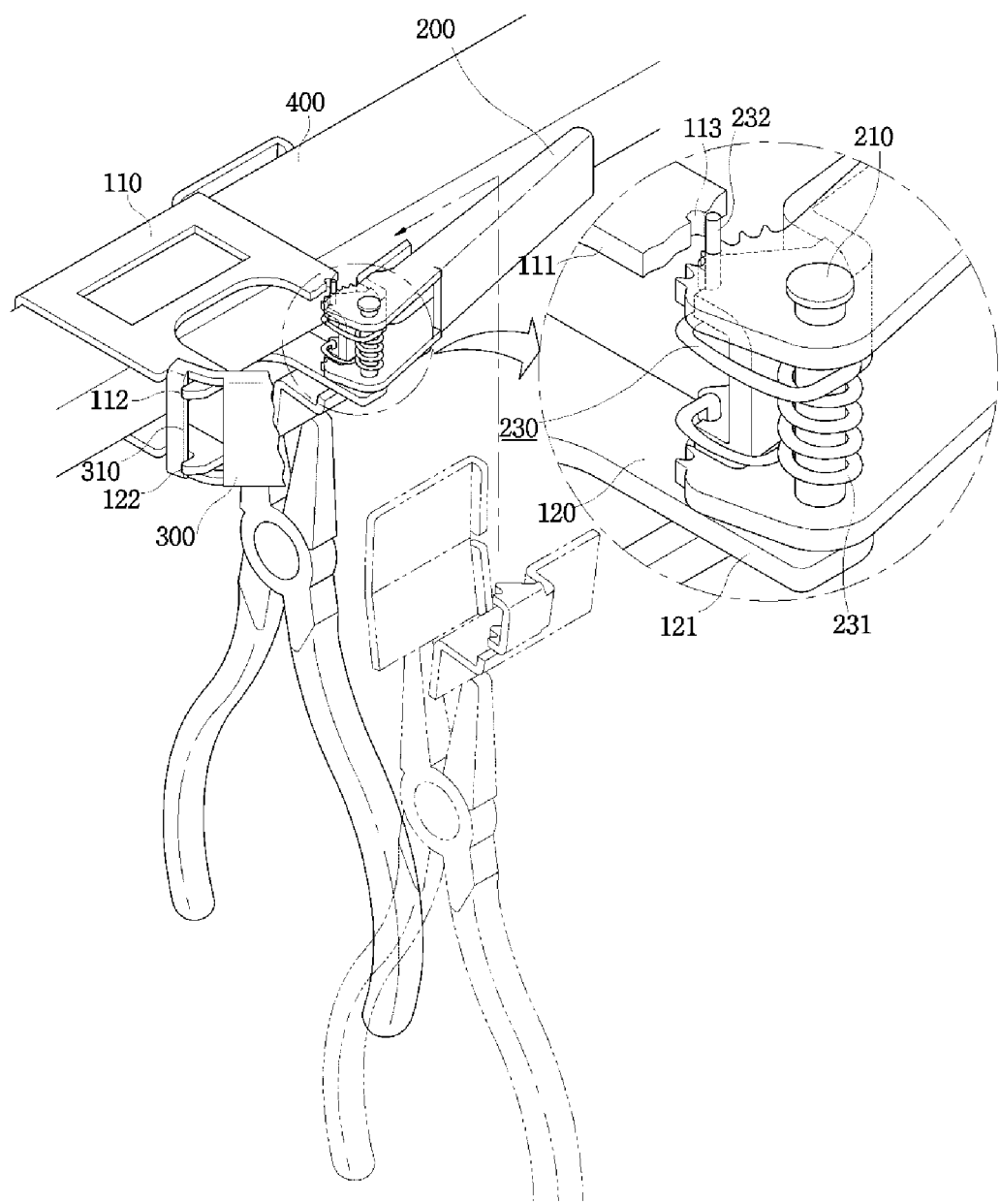
FIG. 14 is a perspective view of release tool locking means of the present invention.

FIG. 13 illustrates a mounting bracket according to a sixth preferred embodiment of the present invention. As shown in the drawing, the mounting bracket illustrated in FIG. 13 is suitable for a sprinkler mounting device using a support bar 400 having a groove portion 410 formed at a lower central portion thereof in a longitudinal direction.

The mounting bracket includes a through hole 124 formed on a lower face 120 thereof in correspondence to a width of the groove portion 410 and protruding pieces 125 upwardly bent at both sides of the through hole 124 in such a way that the protruding pieces 125 are insertedly fit into the groove portion 410. The protruding pieces 125 serve to hold the position of the mounting bracket 100 even in a state where the reducer 500 is not joined thereto.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A sprinkler mounting device for installation spanning offset T-shaped frames, the sprinkler mounting device comprising a mounting bracket, the mounting bracket comprising:
    a C-shaped bracket body having a closed face bent between parallel upper and lower faces configured to allow a support bar of the mounting device to be insertedly mounted between the upper and lower faces;
    mounting slots respectively formed on the upper and lower faces configured to receive a reducer;
    retaining jaw portions of the C-shaped bracket body, each being formed at one side of each of the mounting slots;
    a lever mounted rotatably on a first hinge shaft at the other side of the mounting slots, the first hinge shaft being located on the C-shaped bracket body on an opposite side of the mounting slots from the retaining jaw portions; and
    a tightening member bent in correspondence to a section of the reducer, the tightening member having a locking recess formed at one side thereof and secured to the retaining jaw portions and a hinge space portion formed at the other side thereof, the tightening member being mounted rotatably on a second hinge shaft of the lever.

2. The sprinkler mounting device according to claim 1, further comprising:
    elongated holes formed at sides of the upper and lower faces;
    a spring having a spirally wound portion, to which the first hinge shaft is fit therein, and vertical end portions extending from both ends of the spirally wound portion and being inserted into the respective elongated holes; and
    a one-way latch portion formed at one end of the lever so as to correspond to the vertical end portions.

3. The sprinkler mounting device according to claim 1, wherein the tightening member further comprises upper and lower stoppers protrudingly formed substantially at the centers of horizontal portions thereof and configured to substantially correspond to a plurality of horizontal grooves formed on flat portions of the reducer.

4. The sprinkler mounting device according to claim 1, wherein the mounting bracket comprises cut portions formed at both sides of the closed face and cut pieces inwardly inclined away from the cut portion, the cut pieces being configured to be inserted into a plurality of vertical groove portions formed on a rear face of the support bar.

5. The sprinkler mounting device according to claim 1, wherein the mounting bracket comprises a screw hole penetratingly formed in the closed face and a tightening screw threadably engaged in the screw hole.

6. The sprinkler mounting device according to claim 1, wherein the mounting bracket comprises a through hole formed on a lower face thereof in correspondence to a width of a groove portion formed on a lower central portion of the support bar in a longitudinal direction and protruding pieces upwardly bent at both sides of the through hole so that the protruding pieces are configured to be insertedly fit into the groove portion.

7. A sprinkler mounting device for installation spanning offset T-shaped frames, the sprinkler mounting device comprising a mounting bracket, the mounting bracket comprising:
    a C-shaped bracket body having a closed face bent between parallel upper and lower faces configured to allow a support bar of the mounting device to be insertedly mounted between the upper and lower faces;
    mounting slots respectively formed on the upper and lower faces configured to receive a reducer;
    retaining jaw portions of the C-shaped bracket body, each being formed at one side of each of the mounting slots;
    a lever mounted rotatably on a first hinge shaft at the other side of the mounting slots, the first hinge shaft being located on the C-shaped bracket body on an opposite side of the mounting slots from the retaining jaw portions;
    elongated holes formed at sides of the upper and lower faces;
    a spring having a spirally wound portion, to which the first hinge shaft is fit therein, and vertical end portions extending from both ends of the spirally wound portion and being inserted into the respective elongated holes; and
    a one-way latch portion formed at one end of the lever so as to correspond to the vertical end portions.

8. A sprinkler mounting device for installation spanning offset T-shaped frames, the sprinkler mounting device comprising a mounting bracket, the mounting bracket comprising:
    a C-shaped bracket body having a closed face bent between parallel upper and lower faces configured to allow a support bar of the mounting device to be insertedly mounted between the upper and lower faces;
    mounting slots respectively formed on the upper and lower faces configured to receive a reducer;
    retaining jaw portions of the C-shaped bracket body, each being formed at one side of each of the mounting slots;
    a lever mounted rotatably on a first hinge shaft at the other side of the mounting slots, the first hinge shaft being located on the C-shaped bracket body on an opposite side of the mounting slots from the retaining jaw portions; and
    a tightening member bent in correspondence to a section of the reducer, the tightening member having a locking recess formed at one side thereof and secured to the retaining jaw portions and a hinge space portion formed at the other side thereof, the tightening member being mounted rotatably on a second hinge shaft of the lever, wherein the tightening member further comprises upper and lower stoppers protrudingly formed substantially at the centers of horizontal portions thereof and configured to substantially correspond to a plurality of horizontal grooves formed on flat portions of the reducer.

9. A sprinkler mounting device for installation spanning offset T-shaped frames, the sprinkler mounting device comprising a mounting bracket, the mounting bracket comprising:
    a C-shaped bracket body having a closed face bent between parallel upper and lower faces configured to allow a support bar of the mounting device to be insertedly mounted between the upper and lower faces, wherein the mounting bracket further comprises cut portions formed at both sides of the closed face and cut pieces inwardly inclined away from the cut portion, the cut pieces being configured to be inserted into a plurality of vertical groove portions formed on a rear face of the support bar;

mounting slots respectively formed on the upper and lower faces configured to receive a reducer;

retaining jaw portions of the C-shaped bracket body, each being formed at one side of each of the mounting slots;

a lever mounted rotatably on a first hinge shaft at the other side of the mounting slots, the first hinge shaft being located on the C-shaped bracket body on an opposite side of the mounting slots from the retaining jaw portions; and a tightening member bent in correspondence to a section of the reducer, the tightening member having a locking recess formed at one side thereof and secured to the retaining jaw portions and a hinge space portion formed at the other side thereof, the tightening member being mounted rotatably on a second hinge shaft of the lever.

10. A sprinkler mounting device for installation spanning offset T-shaped frames, the sprinkler mounting device comprising a mounting bracket, the mounting bracket comprising:

a C-shaped bracket body having a closed face bent between parallel upper and lower faces configured to allow a support bar of the mounting device to be insertedly mounted between the upper and lower faces, wherein the mounting bracket further comprises a through hole formed on the lower face thereof in correspondence to a width of a groove portion formed on a lower central portion of the support bar in a longitudinal direction and protruding pieces upwardly bent at both sides of the through hole so that the protruding pieces are configured to be insertedly fit into the groove portion;

mounting slots respectively formed on the upper and lower faces configured to receive a reducer;

retaining jaw portions of the C-shaped bracket body, each being formed at one side of each of the mounting slots;

a lever mounted rotatably on a first hinge shaft at the other side of the mounting slots, the first hinge shaft being located on the C-shaped bracket body on an opposite side of the mounting slots from the retaining jaw portions; and a tightening member bent in correspondence to a section of the reducer, the tightening member having a locking recess formed at one side thereof and secured to the retaining jaw portions and a hinge space portion formed at the other side thereof, the tightening member being mounted rotatably on a second hinge shaft of the lever.

* * * * *